(12) United States Patent
Arteaga

(10) Patent No.: US 7,035,912 B2
(45) Date of Patent: Apr. 25, 2006

(54) METHOD AND APPARATUS ALLOWING A LIMITED CLIENT DEVICE TO USE THE FULL RESOURCES OF A NETWORKED SERVER

(75) Inventor: Carlos Arteaga, Roswell, GA (US)

(73) Assignee: Abaco.P.R., Inc., Houston, TX (US)

( * ) Notice: Subject to any disclaimer, the term of this patent is extended or adjusted under 35 U.S.C. 154(b) by 896 days.

(21) Appl. No.: 09/769,501

(22) Filed: Jan. 26, 2001

(65) Prior Publication Data

US 2002/0026495 A1 Feb. 28, 2002

Related U.S. Application Data

(63) Continuation-in-part of application No. 09/648,788, filed on Aug. 28, 2000.
(60) Provisional application No. 60/151,288, filed on Aug. 28, 1999.

(51) Int. Cl.
*G06F 15/16* (2006.01)

(52) U.S. Cl. .................. 709/217; 709/217; 709/219; 709/203

(58) Field of Classification Search ............ 709/217, 709/219, 203, 200, 231, 201, 227
See application file for complete search history.

(56) References Cited

U.S. PATENT DOCUMENTS

| 4,949,248 A | * | 8/1990 | Caro | ............................ 709/203 |
| 5,644,726 A |  | 7/1997 | Oppenheimer | |
| 5,748,892 A | * | 5/1998 | Richardson | ............................ 709/200 |
| 5,826,027 A |  | 10/1998 | Pedersen et al. | |
| 5,862,348 A |  | 1/1999 | Pedersen | |
| 5,913,060 A |  | 6/1999 | Discavage | |
| 5,923,842 A |  | 7/1999 | Pedersen et al. | |
| 5,933,816 A |  | 8/1999 | Zeanah et al. | |
| 5,940,811 A |  | 8/1999 | Norris | |
| 5,961,586 A |  | 10/1999 | Pedersen | |
| 5,987,431 A |  | 11/1999 | Johnston et al. | |
| 6,014,694 A |  | 1/2000 | Aharoni et al. | |
| 6,016,476 A |  | 1/2000 | Maes et al. | |
| 6,023,721 A |  | 2/2000 | Cummings | |
| 6,023,749 A |  | 2/2000 | Richardson | |
| 6,052,120 A | * | 4/2000 | Nahi et al. | ............................ 715/700 |
| 6,057,857 A |  | 5/2000 | Bloomfield | |
| 6,065,043 A | * | 5/2000 | Domenikos et al. | ............................ 709/217 |
| 6,065,118 A |  | 5/2000 | Bull et al. | |
| 6,081,623 A |  | 6/2000 | Bloomfield et al. | |
| 6,084,584 A |  | 7/2000 | Nahi et al. | |
| 6,088,515 A | * | 7/2000 | Muir et al. | ............................ 709/217 |
| 6,115,040 A | * | 9/2000 | Bladow et al. | ............................ 709/217 |
| 6,393,569 B1 | * | 5/2002 | Orenshteyn | ............................ 709/203 |
| 6,430,607 B1 | * | 8/2002 | Kavner | ............................ 709/217 |
| 6,438,598 B1 | * | 8/2002 | Pedersen | ............................ 709/227 |
| 6,446,109 B1 | * | 9/2002 | Gupta | ............................ 709/203 |
| 6,687,745 B1 | * | 2/2004 | Franco et al. | ............................ 709/219 |

\* cited by examiner

*Primary Examiner*—Ario Etienne
*Assistant Examiner*—Ramy M. Osman
(74) *Attorney, Agent, or Firm*—Smith, Gambrell & Russell, LLP

(57) ABSTRACT

A thin-client system operative over a communications network provides a thin-client device with access to a dedicated application present at a server. Messages between the client device and the server conform to a control-oriented protocol that restricts the type of message permissible for transmission to only those descriptive of certain preselected events that are necessary for execution of the dedicated application on the server and excludes transmission of user actions that otherwise would be transmitted to the server from the client device according to conventional display-based protocols.

3 Claims, 11 Drawing Sheets

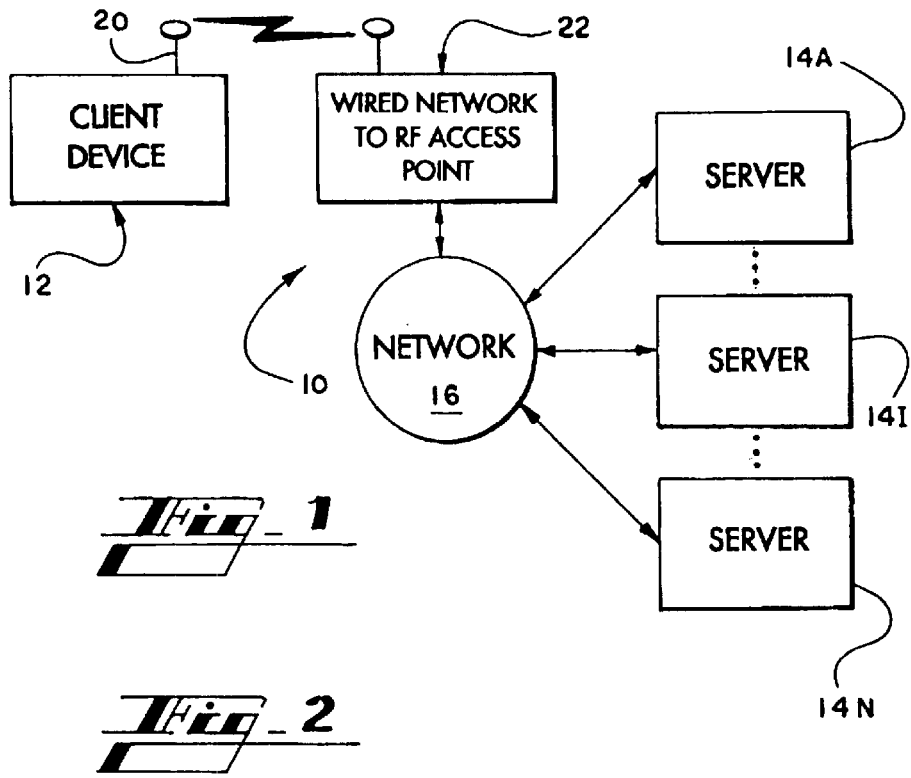
Fig_1
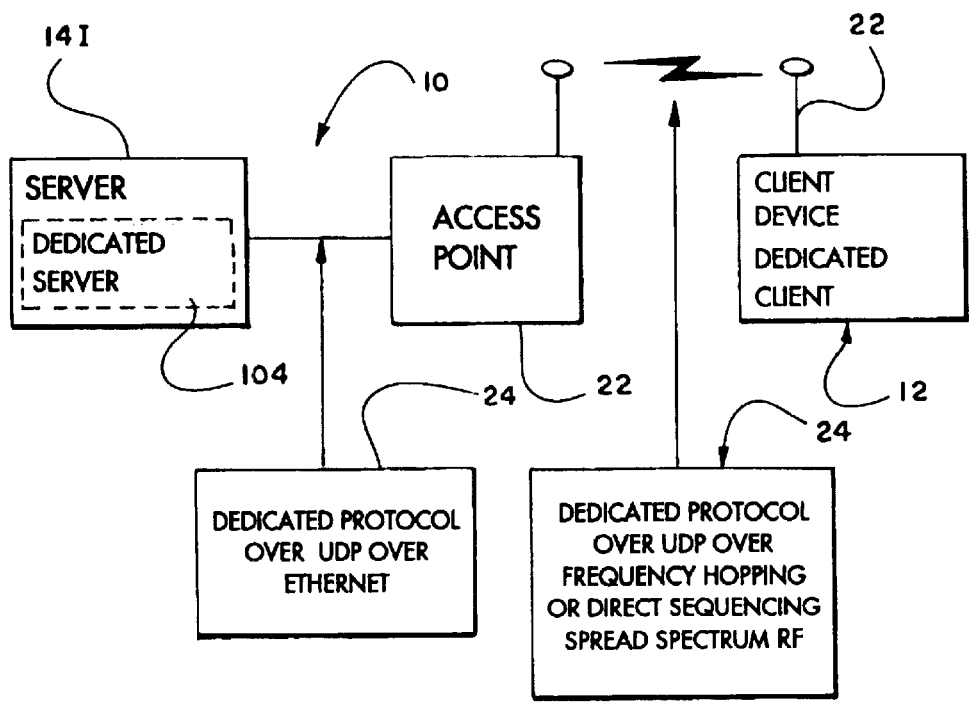
Fig_2

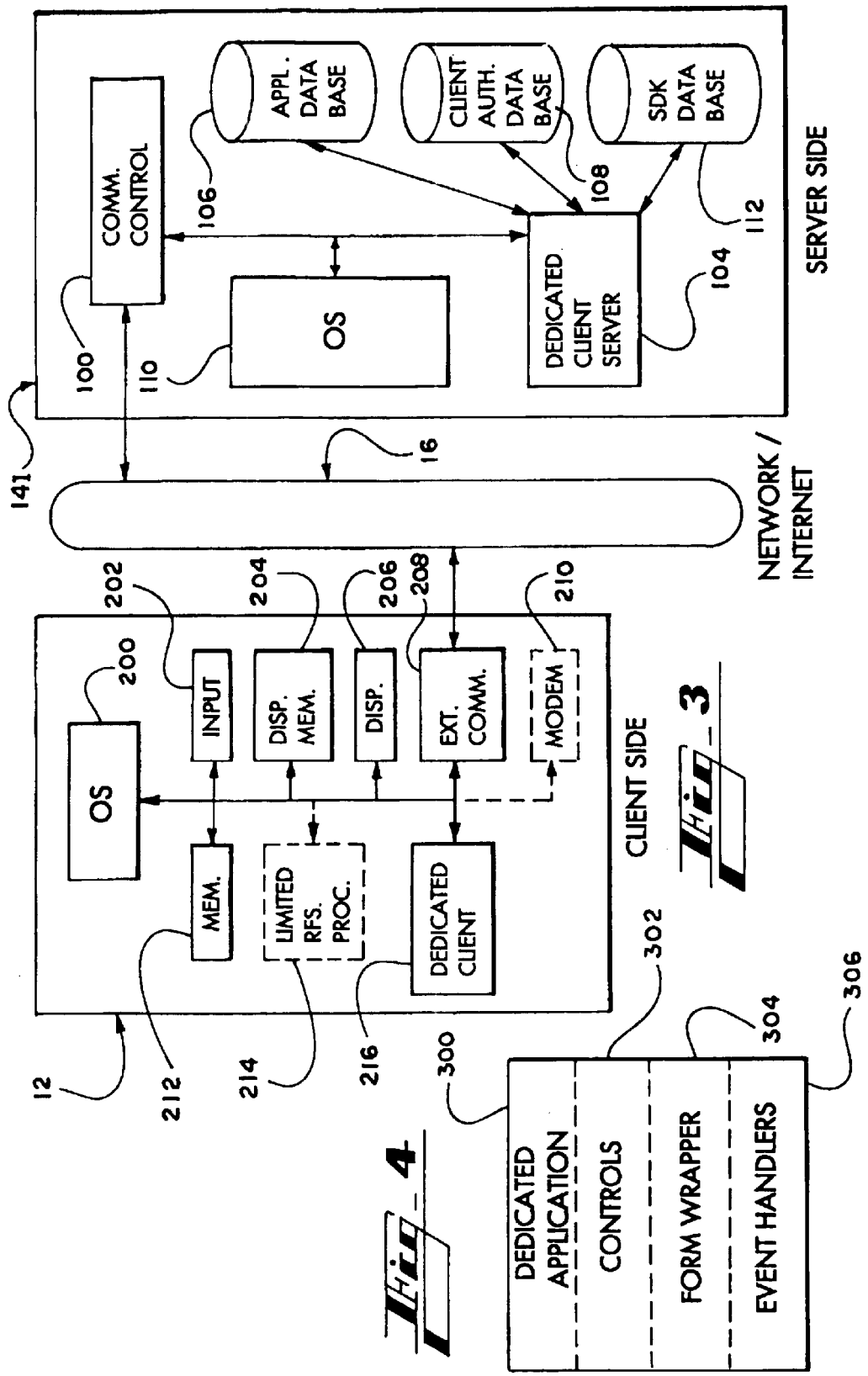

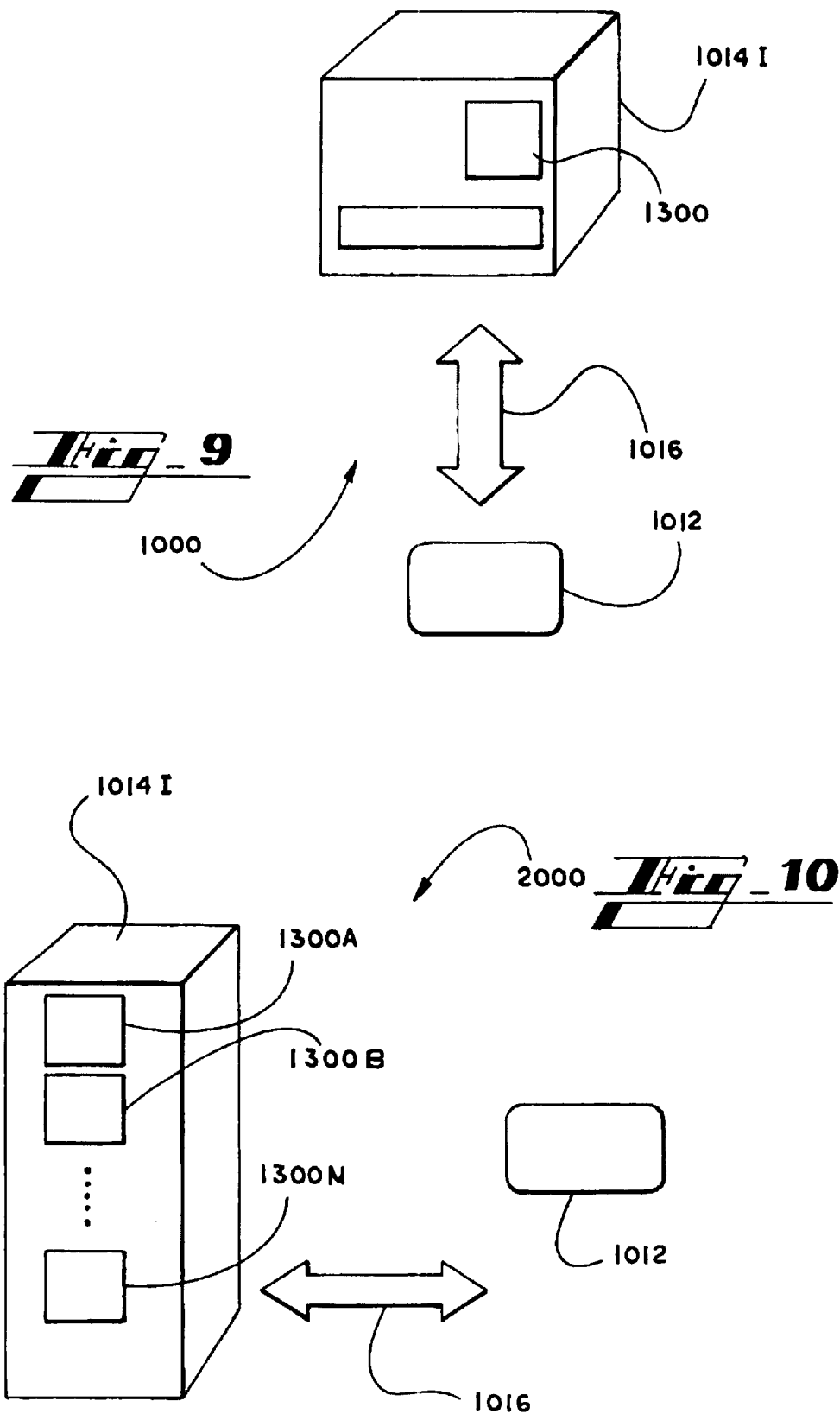

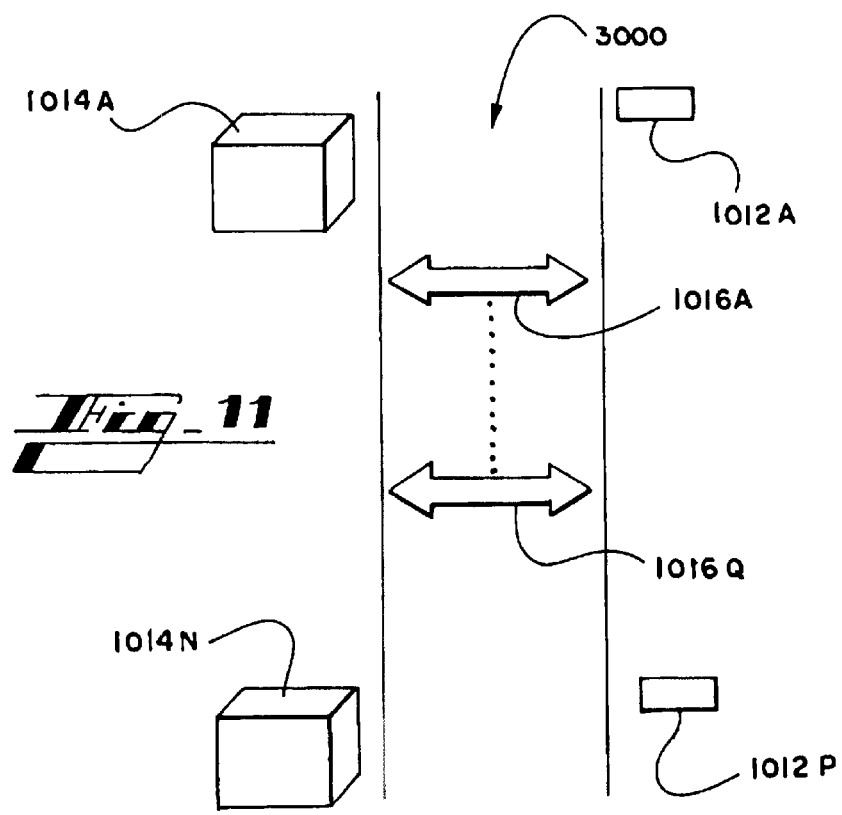
Fig_11
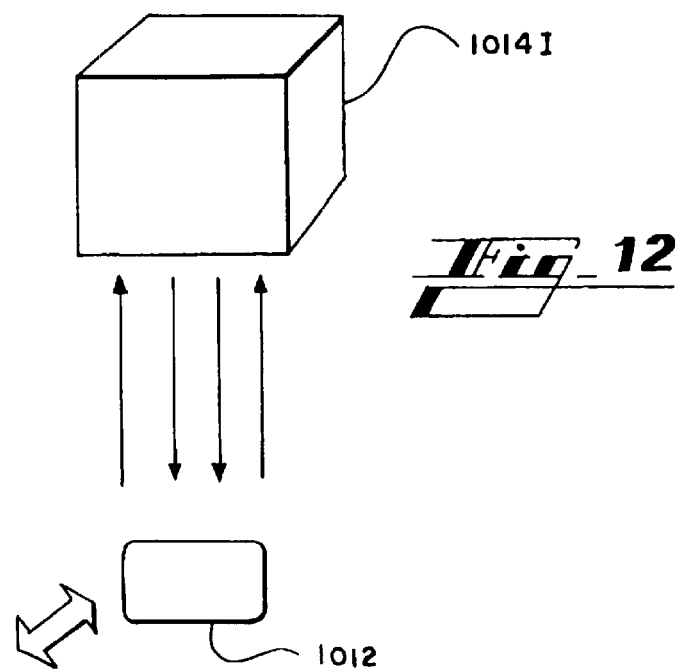
Fig_12

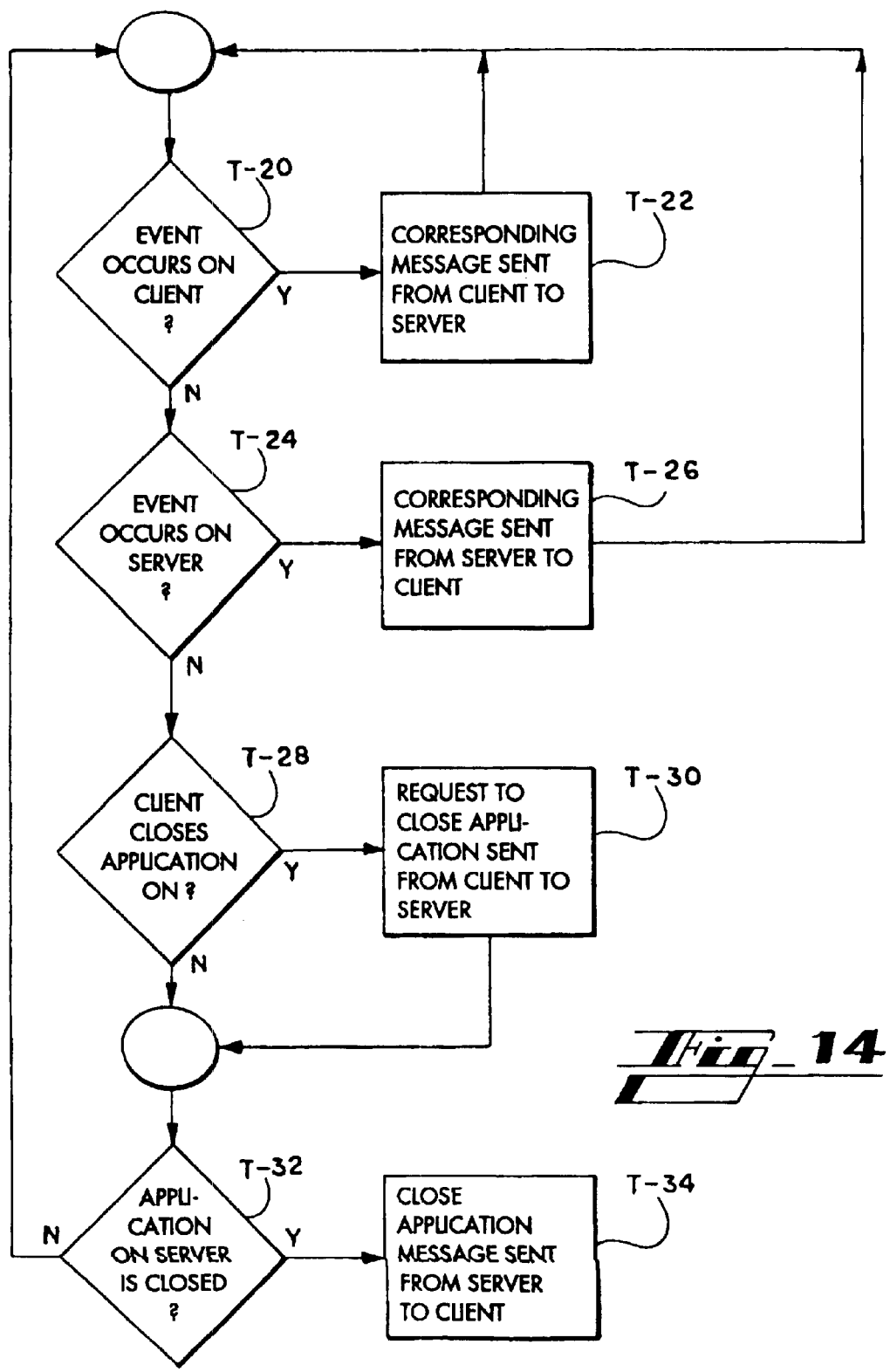
Fig_14

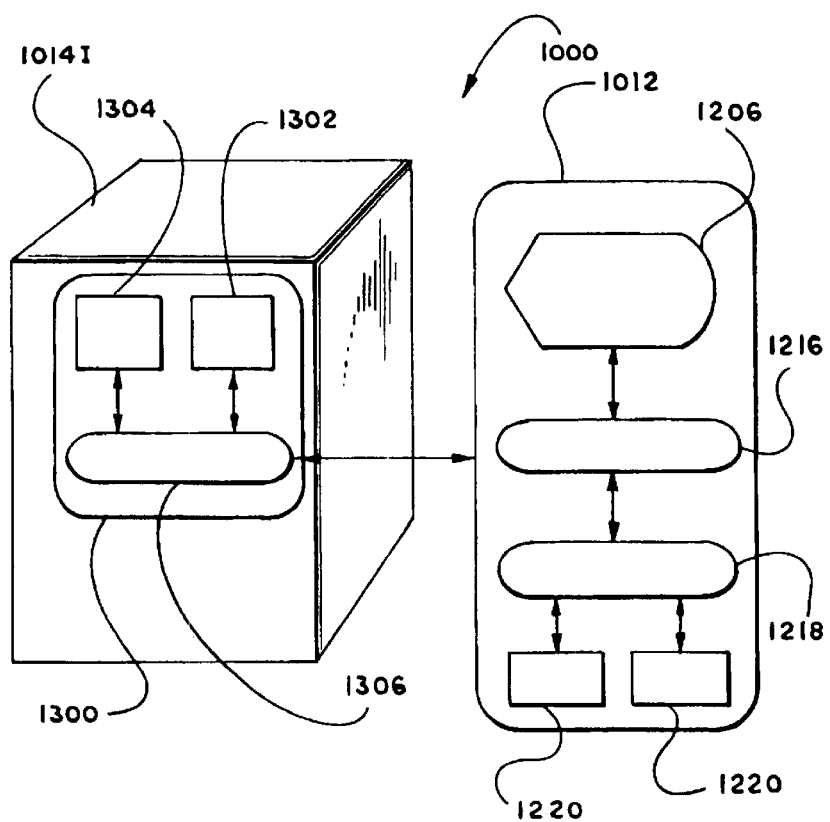
Fig_15

METHOD AND APPARATUS ALLOWING A LIMITED CLIENT DEVICE TO USE THE FULL RESOURCES OF A NETWORKED SERVER

This application is a continuation-in-part of co-pending application Ser. No. 09/648,788 filed Aug. 28, 2000, which is incorporated herein in its entirety, by reference, and which is based upon provisional application Ser. No. 60/151,288 filed Aug. 28, 1999.

BACKGROUND OF THE INVENTION

The present invention is both a method and an apparatus that enables a client device which has very limited processing capability, namely a "thin-client" device, to access and use the fall resources of a server over a network. In particular, the present invention relates to a method and an apparatus in which a thin-client device and a server communicate over the network by messages that represent discreet events and that adhere to a control-oriented protocol in accordance with the invention.

With the explosion of the Internet, a worldwide focus has been placed on the discipline known as network computing. The Internet has demonstrated to the world the immense power and opportunity presented by the capability of individuals in different locales to exchange and view information. Simultaneously, the Internet has proven that the thin-client computing model, where multiple client devices access information stored on centralized servers, is a viable and efficient means of organizing a computer infrastructure.

Concurrent with the renewed interest in network computing, computing technology continued to provide less expensive devices with ever increasing options to connect with remote computing devices via a growing number of varied communications network infrastructures. While the Internet has acted as a catalyst for development and improvement of the methodologies used to exchange, distribute and access data stored on distinct and remote computing machines, relatively little improvement has been made in the way in which applications stored on distinct and remote computing machines, are shared. The thin-client computing model, while not a new phenomenon, has been widely accepted by organizations engaged in providing access to applications to a large number of potential users. The thin-client computing model has been widely embraced due to its lower cost of maintenance when compared with the alternative thick-client computing model, as well as ease with which a thin-client computing installation can be upgraded.

However, the current normally accepted methods of achieving thin-client access to central applications have not evolved along with the nature and capability of the applications being accessed. The focus of these older thin-client computing methodologies traditionally has been either character-based application access, or thin-client computing via a network of fixed workstations with permanent and otherwise reliable connections to a wired communications network. Typically, these conventional methodologies, and conventional architecture incorporating such methodologies, have adopted a display-based protocol for regulating data transmission between the thin-client and the server computer. Extending such conventional thin-client architecture to wireless devices immediately confronts the challenges of limited bandwidth. Conventional architectures have proven inefficient and ill-suited for the constraints imposed by limited bandwidth in wireless communication.

SUMMARY OF THE INVENTION

The invention described herein addresses, among other things, the inefficiencies of a display-based protocol over limited bandwidth. The invention uses a highly efficient communication protocol that is control-based rather than display-based as conventionally used in thin-client architectures. This allows efficient access to server-based applications from varying client devices with limited capabilities and interfaces over any network communications infrastructure capable of delivering messages, complying with the control-oriented protocol of the present invention, between a server and a thin-client device. The present invention thus enables a thin-client device, having minimal software and/or a minimal operating system, to efficiently transmit messages compliant with the control-oriented protocol over the communications network medium, to start, control, close and otherwise use applications that have been compiled with controls compliant with the protocol. These applications, dedicated to the inventive protocol, reside at or otherwise are accessible from one or several server computer(s). The server transmits user-interface description data, input/output hardware control data, and user-interface and hardware event data to the client device using a predefined set of messages that are in accord with the protocol. The client device, in turn, uses the user-interface description data to locally construct a representative user interface. Likewise, the thin-client uses received input/output hardware control data to operate input/output hardware incorporated or attached to the client device, and/or received user-interface and hardware event data to perform corresponding events locally on the client device. Of course, the same pre-defined messages of the control-oriented protocol can originate from the client device and be transmitted to the application on the server, in response to corresponding user or hardware actions on the client device.

The invention allows a dedicated application to be started, operated, closed and otherwise run by multiple clients simultaneously. On the server, such operation creates multiple instances of the application, directly equivalent in number to the number of client requests to operate any given application. Conversely, any client device can start, operate, close and otherwise run any number of applications residing on, or accessible by, any number of servers concurrently. The application receives input from, and directs output to any input/output (I/O) mechanism resident on the client device. According to the present invention, the application also will be notified of, and made to respond to events relevant to the client device such as a low power source condition event, or an out of communication network condition event, in addition to other normal client device operation events such as the touching ('a click') of a screen element on the client device event, or a suspension of the application (on the client device) event, followed by a resumption of the application (on the client device) event.

According to the invention, different client devices, that is client devices utilizing different operating systems (or minimal operating systems), and client devices of varying size, orientation, input and output capability and/or communications network compatibility, run and otherwise utilize the same dedicated application or group of applications on either the same, or different servers. On the other hand, the invention provides that one source code of an application to be compiled or consolidated to be executable or interpretable by the server, subsequently can be run (controlled) by such various different client devices.

An important aspect of the invention is that it is a methodology for creating messages to allow remote access to the events, features and operation of computing objects and the resources of the server, and simultaneous access by the application to device-specific hardware and features of the client device. Interpretation of messages will become apparent as straightforward to those of ordinary skill in the art. Those of such ordinary skill will appreciate that the present invention could be implemented using a variety of distinct software languages and/or hardware control languages for both the client device and the application to be executed on the server machine. Examples of contemplated software languages are Java®, the C and C++ programming languages, the Object Pascal programming language, and other such high-level programming languages. Examples of hardware control languages and mechanisms are Assembler language specific to a given hardware device, microprocessors and micro-controllers equipped with hardware instruction sets, and other such low-level programming languages and hardware control mechanisms. Where the invention is carried out in this way, the client device will have the capability to run applications concurrently on several distinct servers, regardless of whether the servers have different operating systems, or different application command interpreters. Examples of different operating systems contemplated for use with the present invention are Microsoft® Windows NT®.RTM, Hewlett Packard® HP-UX®.RTM, Sun Microsystems® Solaris®.RTM, versions of the Linux® operating system, and other such operating systems.

According to the invention, the application, while being run from the client device, appears as if it were running on the client device. Preferably, the application appears with the display characteristics of any applications customarily residing on the client device, should the client device itself have the capability to store and run applications locally. It also is contemplated that client software, compliant with messages in the dedicated control-oriented protocol and residing on the client device, can be installed and subsequently updated and/or re-installed over the communications network. Provided that there is an initial minimal software or other hardware instruction set, compliant with, at minimum, the subset of messages in the protocol associated with installation and transfer of the client software, the client software can be distributed to the server, and subsequently downloaded and installed by a client device utilizing an available communications network medium.

In accordance with the invention, a client device requires: a display allowing the user of the client device to see textual and/or graphical information; an external communications interface allowing the client device to transmit and receive messages complying with the control-oriented protocol to the server over such communications medium; and minimal software dedicated to the protocol and capable of receiving input from the user, or input from other input devices associated with the client device. The client device dedicated software issues commands to control the display of the client device, and interprets and generates messages that conform to the control-oriented protocol.

Further in accordance with the invention, an application dedicated to the control-based protocol of the invention must incorporate controls conforming to the protocol. The protocol is incorporated at the time the source code of the application is generated so that the application is capable of interpreting and providing messages included in the control-oriented protocol. The application is provided with the capability to transmit and receive messages according to the control-oriented protocol by a communication control device in the server. Alternatively, use can be made of adjunct software capable of transmission and receiving of messages over the applicable communications medium. The application runs and/or otherwise issues commands to the server so as to accomplish tasks readily associated with software applications in use worldwide.

Still further in accordance with the invention, the server computer requires: a communications control device capable of placing messages on the communications medium; the capability to receive, respond to, generate and otherwise interpret and execute commands issued by the application by means of an operating system, or otherwise. The server performs these functions for one instance of an application, or simultaneously for multiple instances of an application.

Yet further in accordance with the invention, the control-oriented protocol of the invention generally restricts data, that is, it generally restricts messages communicated between the thin-client and the server to only events necessary for execution of the application on the server, and to other important hardware-oriented events. By so restricting the nature of informational messages communicated between client and server, the inventive protocol provides for full client access to applications on the server, within the constraints of narrow bandwidth characteristic of wireless systems. In the case of actions by the user at the client device, the disclosed control-oriented protocol permits generation of messages destined for the server, from the client, to only those descriptive of certain, significant events. A significant user event, for example, is interpreted or recognized by the application as indicative of the user's operation of a certain associated application control presented at the user interface on the client device. The message transmitted to the server includes data necessary to describe this preselected event but excludes other data that, in a display-based protocol, also would be transmitted to the server because it represents other action taken by the user to operate the associated control. Such other data is excluded because it does not represent the preselected event.

An example used in this disclosure is defining a mouse "click" as a selected event, but not so defining mere mouse movements. In this example then, the client device would not transmit messages to the server while the user merely moved a mouse at the client device, but would send a message as soon as the user "clicked on" an application control displayed on the user interface. At the server, receipt of the message informs the application that an event has occurred at the client device. The application interprets the event message as indicating that the associated displayed application control has been operated ("clicked"), and thereafter responds appropriately.

Messages from the application to the client likewise are constrained to preselected events. In addition, various hardware-oriented events, discussed in detail hereafter, are described by messages between the client and the server.

BRIEF DESCRIPTION OF THE DRAWINGS

Further aspects and features of the present invention will be even more apparent from the following detailed description and drawings, and the appended claims. In the drawings:

FIG. 1 is a block diagram of a thin-client system over plural possible networks in accordance with the present invention;

FIG. 2 illustrates an overlay of a control-oriented protocol in accordance with the invention on a conventional wireless protocol suitable for use in the system of FIG. 1;

FIG. 3 is a detailed block diagram of a preferred thin-client device and an associated server computer suitable for use in the system of FIGS. 1 and 2;

FIGS. 4A and 4B together show a flow chart of operation in accordance with the present invention;

FIG. 7 is a simplified block diagram of an alternative system configuration according to the present invention; and FIGS. 8–10 present exemplary screen displays with FIG. 8 showing a new project for development of a new dedicated application in a commercially available visual development language, FIG. 9 showing an exemplary new dedicated application running on the server side, and FIG. 10 showing the application of FIG. 9 mimicked on the client side.

DETAILED DESCRIPTION OF THE PREFERRED EMBODIMENTS

Figure 5A:
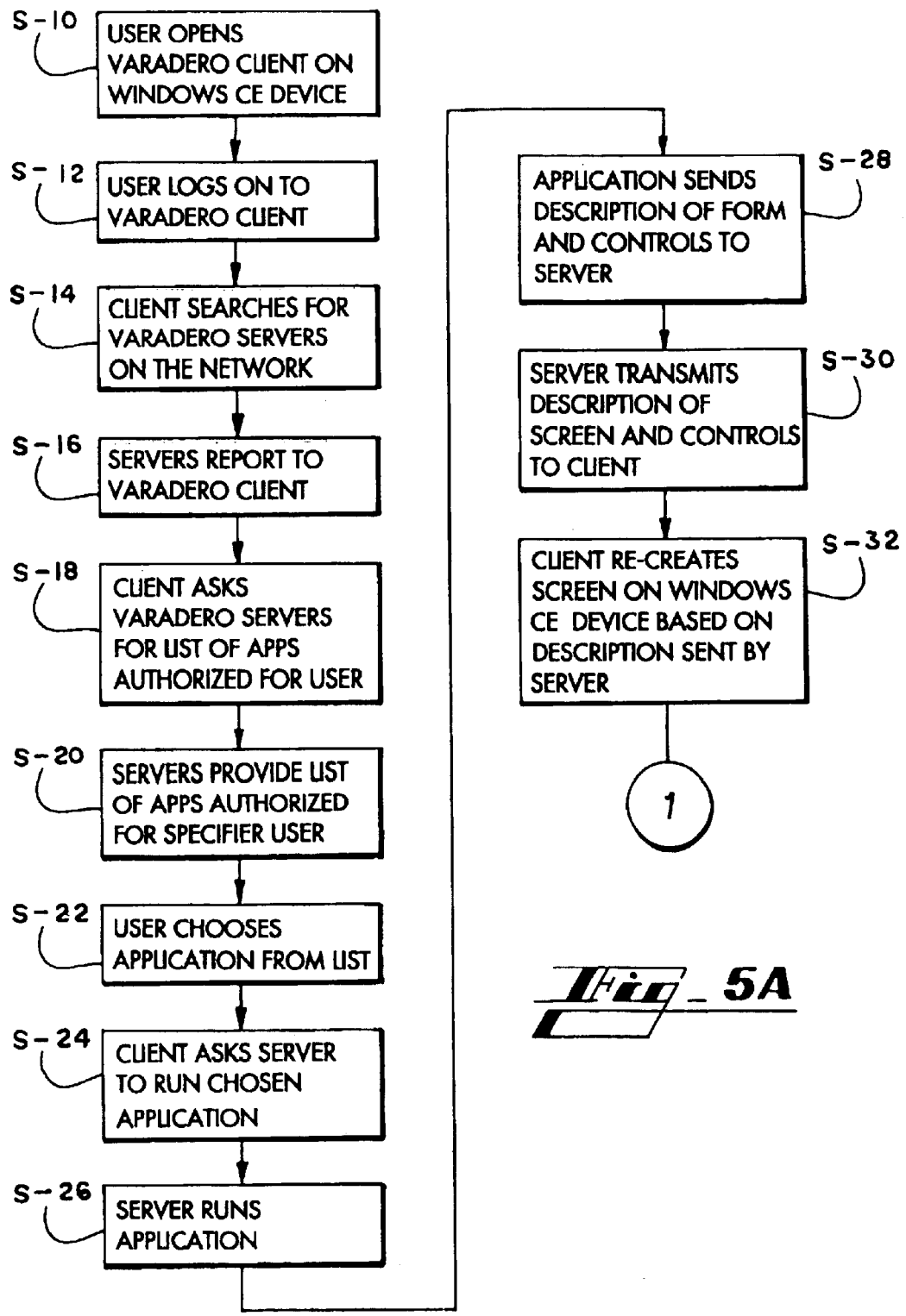
FIG. 5 is a structure chart illustrating the process of updating and/or installing dedicated client software in accordance with the invention.

FIG. 1 shows a system providing overall system thin-client devices with access to the full resources of a server in accordance with a preferred configuration of the present invention. In FIG. 1, system 10 is seen to include multiple client-side devices 12A through 12M. System 10 supports many such client devices 12, and such devices 12 can enter and exit the system at random. System 10 provides access for any arbitrary client device 12I to a plurality of servers 14A through 14N on the so-called server-side. Servers 14A through 14N, in turn, are connected to each other and to the client devices over at least one network 16 which provides the communication medium. A second network also is shown in broken lines as it will be apparent that multiple networks can be incorporated in the preferred system. Such communication mediums could comprise telephone switching networks, ethernet networks, Wireless 802.11 networks, Mobitex® messaging networks and the like. Because transmission between elements of system 10 can be carried out in a connectionless manner, in the preferred arrangement of FIG. 1, exemplary client-side device 12I is contemplated as a hand-held, wireless device. However, as apparent to those of ordinary skill in the art, any client-side device could, instead, be a desktop device with limited processing power. Where client device 12I is a hand-held, wireless device, it includes an external communication link and a (schematically-depicted) antenna 20 for connection with the network 16 at an available RF access point depicted as block 22.

With reference now to FIG. 2 also, system 10 is shown with a block-diagrammic representation of a dedicated protocol for system 10 overlaid on any conventional standard wireless communication protocol. The wireless protocol ensures accurate RF communication between an associated exemplary client device 12I and likewise an exemplary server 14I over wireless network 16. In this preferred implementation, communication between client device 12I and server 14I is established with the User Datagram Protocol (UDP), along with a dedicated, control-oriented protocol 24 unique to system 10. Also in such a preferred embodiment, the UDP may be based upon frequency hopping or direct sequencing in spread-spectrum RF. The UDP does not require maintenance of a constant connection between any client device and the network, and so this base protocol is desirable when one considers that wireless client devices may move into and out of range of radio connection with a wireless network 16 at random. This situation permits the client-side devices to be powered down when connection with the network is lost, thus better conserving batteries in the client devices. Dedicated, control-oriented protocol 24 will be discussed at length infra.

Each client device 12A through 12M has the capability to transmit and receive messages over the communications network medium 16. Each server 14A through 14N likewise has the capability to transmit and receive messages over the medium 16. The contents of the messages transmitted between the client devices and the servers in system 10 are governed by the control-oriented protocol to be discussed. Additionally, each server 14A through 14N has the capability to run and otherwise interpret what will be referred to as "dedicated" applications 13A through 13O depicted as residing on the exemplary server 14I. It goes without saying that while only server 14I is shown with residing dedicated applications 13A through 13O, all servers 14A through 14N of system 10 can have residing dedicated applications, or at least access to such applications. Software and/or hardware on each client device, each dedicated application, and an optional administrative server application 15 all have capability to generate and interpret messages conforming to the preferred protocol of the invention.

Due to the message-based nature of the preferred control-oriented protocol, it will become apparent to those of ordinary skill in the art that multiple distinct applications can be run on any server 14I, from any client device 12I, regardless of the multitasking capability of the client device. The only process (dedicated client) that need actually run on the client device 12I is the client software required to communicate with the applications 13A–13O. This software process handles communication with multiple applications running on one, or multiple servers, by intelligently switching between applications under the direction of the client device user.

Similarly, it is contemplated that any such client device 12I can concurrently run applications on multiple of servers 14A–14N. Client device 12I concurrently manages messages of the control-oriented protocol with multiple distinct applications, and so any applications executable on any of servers 14A–14N that are accessible to the client device, through any particular communications medium, can be engaged by the client device.

As mentioned earlier in connection with system 10 of FIG. 1, the multiple client devices 12A–12M access a plurality of server computing machines 14A–14N over one or a plurality of communications network mediums. This many-to-many relationship is possible because the control-oriented message based nature of the protocol necessitates that communication pass only between the client devices to the applications (on the servers) upon the occurrence of certain selected events relevant to the dedicated application or applications in use.

Exemplary Client-Side and Server-Side Devices

We turn to FIG. 3 for details of exemplary, preferred wireless, client-side device 12I and a preferred server 14I. Server 14I includes a communication control 100 for regulating the transmission and receipt of data over network 16. Internal server software and/or hardware shown and referred to as "dedicated" server 104 is associated with the client devices for message communication therewith. Dedicated client server 104 handles all client device requests for creating and running applications specifically "dedicated" for use in accordance with the invention. The dedicated server 104 accesses a dedicated application data base 106, and a client identification and/or authorization data base 108. In preferred configurations, a software development toolkit (SDK) data base 112, shown in phantom lines, also could be provided. In any given server 14I, application data base 106 stores one or more of dedicated applications 13A through 13O figuratively shown in FIG. 1 and made available to the plural client devices. Server 14I also has access to like data bases 106 and 108 provided in other servers in system 10, and also can have access to any other remote such data base. Application data base 106 is complemented by the client/authorization data base 108 which contains a list of users and client devices already recognized by system 10. Preferably, applications stored in data base 106 are organized into groups so that individual users can be assigned rights in the different application groups. Access to applications then can be controlled by the specification of such groups. It is relatively simple to enforce a security policy where access to the applications in a given group is controlled by allowing only users included in the group to access such applications.

In such a preferred configuration, for each user there is account data with the user's identification, a password, and authorization priority stored in data base 108. This ensures that each client-side device user would have access to run only those applications for which the user has proper authorization. It is contemplated that all passwords would be encrypted for transmission.

Where system 10 is configured to accommodate the creation of dedicated applications, SDK data base 112 is preferable. In this data base, all controls for creating dedicated applications can be stored. Of course, all such controls will be made to comply with the control-oriented protocol discussed infra.

Server 14I also is shown to include an operating system 110. The operating system 110 coordinates operation of all elements of server 14I. Operating system 110, equipped with dedicated server 104, is provided with the capability to receive, respond to, generate and interpret and execute commands issued by a dedicated application, and to perform those functions simultaneously for multiple instances of any such dedicated application. In a contemplated commercial embodiment, operating system 110 comprises a Windows NT® operating system.

On the client side, a preferred client device 12I also is seen to include an operating system 200. Operating system 200 is contemplated as limited insofar as it is incapable of creating and/or executing the dedicated applications stored in data base 106 (on the server side). In the contemplated commercial embodiment where server-side operating system 110 comprises Windows NT®, the client operating system 200 could comprise the Windows CE® operating system for mobile devices. However, it should be understood that system 10 will provide like capability for any client operating system 200 including that known by the trade name Palm OS®, that known by the trade name EPOC, Telmet, or any other like operating system used in telephone-type and other hand-held devices known to those of ordinary skill in the art. Although certain commercially available operating systems are discussed as preferred herein, it should be understood that the present invention is not limited to use with any particular operating system, and other graphics oriented operating systems and associated software could be employed.

Operating system 200 coordinates control among user input 202, display memory 204, and user display 206. User input 202 receives input from the user by any of a variety of ways known to those of ordinary skill, such as keypad keys, a touch screen, and the like. Input data entered by the user at input 202 is stored at display memory 204. User display 206 displays both text and graphics and presents data entered at input 202 as well as screens created by running applications.

External communications circuit 208 provides for wireless communication with the network 16. (Schematically-shown antenna 20 is omitted in FIG. 3.) Complementary to external communication 208, a modem 210, indicated in broken lines, could be provided for the direct connection of client device 12I over standard telephone lines. Preferred client device 12I also is shown as including a memory 212. Memory 212 is accessible by operating system 200. Further, it is contemplated that the client device could have certain limited processing resources embodied by processor 214, as also shown in broken lines in FIG. 3.

Client device 12I also includes the process referred to hereinbefore as the "dedicated client" 216. In the preferred embodiment, the dedicated client 216 is software executed on the client device operating system 200 to initiate and handle all communications with dedicated client server 104. Preferably, dedicated client 216 includes an application browser. Those of ordinary skill will come to appreciate that, indeed, the only control software necessary for the client device 12 is software that (i) receives input from input means 202, and perhaps peripheral devices working with the client device; (ii) that controls display 206 and external communication circuit 208, and (iii) that both interprets data messages received from the server, and generates messages to send to the server. Dedicated client 216 can be made to perform all of these functions, and therefore, can substitute for any operating system 200 in the client device 12.

Operating system 200 initiates the dedicated client 216 upon instruction from the user of the client device 12, such as by log-in. Once control has been assumed by the dedicated client 216, our exemplary client device 12I initiates communication with a responding server 14I (or servers) by sending a message to the server indicating that the client would like to open a session with the server. To begin communication with a server 14I, the client device 12I can be made to broadcast a signal over network 16 to request reply by all servers 14A through 14N equipped with dedicated client server 104 and supporting data bases 106, 108 (and 112). Then, upon receipt of such a client device signal over network 16, operating system 110 in any responding server 14I, or servers, turns over control to dedicated server 104, which in turn begins communication with the requesting client 12I.

A "session" is a logical object that a server 14I, in a straightforward implementation, might use to track a user and the applications being run by that user. The message to open a session with the server would include the name of the user (user name), the password of the user, and also some information about the particular client device 12I and the dedicated client software 216 that the user is utilizing to access the server. After receiving the message, preferably the server 14I would check to verify that the user name and password included as part of the message are valid and, if so, to which group the user is assigned. Additionally, the server 14I could use the dedicated client software 216 information provided in the open-session message to check whether there is a more current version, for example, a repository-stored version, of the dedicated client software available for the client device 12I to download. If there is a more recent version of the client software 216 available, server 14I could send the client device 12I a message indicating which software should be downloaded by the client device, and where that software is located, so that the client device can download and install the updated dedicated client software, in accordance with information provided in the message from the server. Client device 12I then could be made to update its dedicated client control software 216 accordingly.

Next, assuming that the user name and password provided by the client device in the open-session message 19 are valid, we see that the server 14I will reply to the client with application list data, i.e., an application list message. As mentioned previously, the application list message data gives the client device 12I the applications that can be run by the user from the client device. Preferably, the application list message includes session setting information that governs the way the client device 12I operates during execution of the session. In a straightforward implementation of the control-oriented protocol, upon receipt of the application-list message, the dedicated client 216 causes display of the application names included in the list on client display 206, in any format such as to allow the user of the client device to select the dedicated application that the user would like to run by way of input 202.

Once the client device user has indicated which application should be run, the client device 12I transmits a run application message via external communication circuit 208 to server 14I. The run application message indicates one application from the previously received application list message that is to be accessed from data base 106 and started by server 14I on behalf of client device 12I. Upon receipt of the run application message, server 14I has all of the information necessary to start an application compliant with the control-oriented protocol. From the information already transferred to the server in the open session message, server 14I has information on characteristics of client device 12I, such as the client device's operating system, screen size, and microprocessor.

Hence, server 14I initializes and starts application 13I by passing all of this client device information to the application, and then running the application with the command appropriate for the operating system 110 of the server. Preferably, the application will be executed depending upon the client device information provided to it at the time that its execution is started. Thus, it becomes apparent that the source code used to create any application 13I preferably includes conditional logic to alter the execution of the application, based on parameters of the client device, and also session options that are in use when the application is started. Where it is preferable that certain applications be started in a condition "hidden" or otherwise without showing the user interface screens of the application on the server, the optional administrative server application 15 of FIG. 1 could control this manner of execution accordingly. In such an execution manner, server 14I would start the application while using the command appropriate for the server operating system to open the application, but without showing the user interface screens of the application.

Once all application initialization steps have been completed and the application has been started, an initial form message is sent from application 13I to client device 12I. The initial form message includes all data necessary for the client device to draw or otherwise create the first screen of the application on the client device display 206. This includes data necessary to create the user interface controls that are to be shown, and the properties of such controls. It will be understood that by transmitting all form information messages in this way, less data need actually be included in the message as compared to conventional display protocol methods for implementing thin-client systems. Upon receipt of the initial form message, client device 12I displays a screen at display 206 to represent the interface. The initial form message communicates how to position and place screen elements on the client device display 206, or otherwise represent the running application on the client device.

Control-Oriented Protocol

Once the application has started on the server, communication between client device 12I and server 14I is restricted to messages descriptive of events. Events generally are classified in two categories: User-Control events and Hardware events. User-Control events occur as a result of interaction between a user and the application interface, either on a server or on a client device. User events are defined as, but not limited to, the activation of certain special keys that may be present on a client device, and the interaction of the user with graphical screen elements on the client device. Examples of such special keys are keys on a standardized U.S. keyboard such as the ENTER key, the ESCAPE key, and the DELETE key. Examples of such interaction common in windowing environments are button clicks, setting of focus from one control to another, freehand drawing or writing on a screen, or so designating areas of a device or device extension. Other specific examples of User-Control events are list-box selection, menu-selection, change of picture image form-close. Other important events could fall within the User-Control Events category, as will become clear from this disclosure.

Hardware events, on the other hand, could be triggered by user action, but they also can occur without user initiation. Hardware events occur on the client device. Hardware events are defined but not limited to the operation of a client device extension by the user. This includes, for example, the triggering of a barcode scanner, or the swiping of a card through a magnetic card reader. Also, receipt of input from a client device extension such as barcode information read by a barcode scanner, or data streams received over a serial COM port interface or the like constitute a Hardware Event. Further, alerts issued by communications hardware resident on the client device, for example, the loss of the communications network signal; and alerts issued by the client device itself such as a low memory condition, or a low power source condition constitute hardware events.

According to the inventive protocol, acknowledgement of successfully transmitted messages also is regarded as an event. Hence, messages transmitted from the client device 12I to the application 13I are acknowledged by the application by transmission of an acknowledgement message from the application to the client device.

All messages are structured with a header section followed by parameters of the message. The message header contains the name of the message which, in turn, indicates the type of event to which the message relates. The parameters contain variable data specific to the associated event. The messages of the control-oriented protocol are interpreted at the endpoints of communication (the client device or the application on the server). At such endpoints, local commands are generated to locally perform the action(s) specified by received messages.

When a Hardware Event or a User-Control Event occurs at the client device 12I, the client device sends a data message to the application 13I to identify the event and any accompanying parameters that further specify the event or data that is associated with the event. In a preferred implementation in a windowing environment, a User-Control event is associated with the selection of an item included in a listbox. After the user selects an item from a listbox by clicking on a listbox control, the client device 12I sends a selection message indicating that an item has been selected from the listbox, along with a parameter indicating which item of the listbox has been selected. Upon receipt of the selection message, the application 13I interprets the message by causing the same action to occur on the server 14I, and correspondingly executing any code associated with the event which, in this example, would be the listbox click event and/or item selected event.

On the other hand, when a User-Control Event occurs in the application on the server 14I, the application 13I processes the event by executing any event procedure and associated code linked to the event, and, in turn, sends a server event message to the client device 12I to appraise which event occurred, along with parameters indicating any new features of the control user interface. For example, after the aforementioned listbox item has been selected on the application 13I, the application preferably transmits a listbox click message to the client device 12I to confirm that the listbox was clicked, and to provide parameters specifying which item was selected by the click, and, where applicable, any other status information concerning the listbox. Data communicated in the listbox click message, when received by the client device 12I, generate a new user interface on the client device at display 206.

It is seen that upon receipt of event messages from client device 12I, application 13I performs the processing specified by the commands in the application program. Generally, this processing culminates with a change to the user interface of the application. Such change to the user interface accordingly is transmitted from the application 13I to the client device 12I. Thereafter, the application 13I will once again await input from the user. When further user input is received, client device 12I transmits an appropriate message to the application 13I and the message receipt and acknowledgement process is started again. Event messages between the user device 12I and the running application 13I thus continue in this manner.

Now we will compare several dedicated application 13I controls (SDK controls) to corresponding controls established for commercially available visual development software. Each of these dedicated controls, when operated by the user at the client device 12I, causes a User-Control Event for which the client device sends a message to the running application. In preferred embodiments where the Windows NT® and Windows CE® operating systems are present on the server 14I and the client device 12I respectively, the dedicated controls would appear to the user as nearly identical to conventional controls such as those that come with Visual Basic®. In this case, the dedicated SDK controls essentially will have a counterpart to all of the standard Windows® controls such as edit boxes, list boxes, buttons, and the like. However, the permissible messages representing windowing environment controls are restricted to describing certain, preselected events. For instance, edit box controls will transmit updated text in a message only when they have been made to lose focus. The (preselected) transmissible event occurs when the user causes the edit box to lose focus. This prevents the transmission of messages at each keystroke. List boxes will transmit only their selections in messages, but will not transmit messages indicative of scrolling. Scrolling alone will not be considered a significant event which justifies message transmission, while list box selection does qualify as a transmissible event. So-called combo boxes will be made to transmit only when a new value is selected therein. Scroll bars will be limited to transmitting their new position, only after scrolling has stopped. Scrolling alone will not be regarded as a significant event and so messages representative of mere scrolling will not be transmitted between the client and the running application. Mouse clicks on an input button, as mentioned above, will be transmitted as a user-control event, but mere mouse movements alone, without more, will not be so transmitted.

Thus, the inventive control-oriented protocol responds to user controls by transmitting messages indicative of only selected significant events from all occurrences that would be transmitted from the client device to the server in a display-oriented protocol. In the disclosed control-oriented protocol, all occurrences of user action are considered as event candidates for the generation of messages in the control-oriented protocol. However, generally only those user action occurrences that are necessary for the execution of the application will be selected as events to be made the subject of permissible messages.

To illustrate the restriction of message-transmissible events from among all user action occurrences that are transmitted from client to server under display-based protocols, we further consider the mouse control. In a display-based protocol, the user's movement of the mouse (without more) on a client device would be an operation for which a mouse movement message would be sent to the running application. Thereafter, the application would transmit a reply message to the client device to represent the mouse movement on the client interface. In the present control-oriented protocol by contrast, mere mouse movements are not selected events for which messages are generated at the client device and sent to the application. Preferably, the dedicated client software 216 will display the mouse movement on the client display 206, but mouse movement data will not be transmitted to the running application. Only when the mouse has been positioned over a control presented on the application interface and clicked would a User-Control Event message be generated at the client device and transmitted to the application. The user's operation of the control by mouse click constitutes a User-Control Event for which a message must be transmitted to the application for processing on the server (application) side.

By so generally limiting messages communicated between the running application 13I and the client device 12I to selected events, the control-oriented protocol thus restricts the amount of data passed between the client device and the server. The protocol is contemplated as allowing the communication of messages indicative of User-Control Events including clicking-on a button, a list-box selection, a menu-selection, necessary changes of picture image, form-closing, and other events necessary in running a given application. However, the preferred control-oriented protocol limits transmitted information to only that necessary to provide execution of the running application. In this way, the control-oriented protocol of the present invention vastly differs from conventional display-oriented protocols where all user events, such as mouse movement messages, and advancing of a cursor message, are transmitted between the thin-client and its server. The preferred protocol of the invention involves generation, transmission and interpretation of only carefully selected events to thereby accommodate the relatively low band-width characteristics of RF (wireless) networks.

As described hereinbefore, the preferred protocol is not limited to User-Control Events, but also includes distinct "Hardware Events" that occur at the client device. Preferably, the protocol generates, interprets and provides transmission for data messages representing important alert conditions including low memory or low battery at the client device, and also hardware events such as receipt of input from a scanner, or serial data input at the client device. Hardware events, of course, also can be triggered by user action, such as when the user connects a bar code scanner as input to the user's thin-client device.

Again, a preferred implementation wherein the server operating system 110 comprises Windows NT® and the client device operating system 200 comprises Windows CE® will be considered. In such an exemplary implementation, all control descriptions would be encoded using WIN32® application program interface (API) parameters for the creation of a window. All messages would use WIN32® data messages. It is recognized that both of these operating systems use WIN32® parameters, and therefore no translations would be necessary. In this implementation, then, data representative of controls and messages can be used directly by the running dedicated application. For instance, where the user presses a button on the client device 12I, data representing the control sent to server 14I would include merely the window handle for the button and the WN_CLICK message. Then, when server 14I receives this control message, it has only to post a WN_CLICK message with the particular handle on the message queue for the running application 13I. Any further control processing would be handled by the server side operating system.

Also, in the preferred implementation of system 10, any software control can be used in a dedicated application, however, only dedicated controls will be made visible to the user on display 206. Conversely, it is contemplated that all applications created using dedicated controls will behave exactly like conventionally-created applications with conventional controls when such applications are run outside of dedicated server 104.

It also has been recognized, for example, that Windows® message boxes are modal. They will act to halt a running application until a control button is clicked. However, where message boxes are pre-defined dialogue boxes that do not make use of controls sent and received between server 14I and client 12I, such message boxes would not be displayed by the client and, therefore, could not be answered by the user. This would freeze the application. For this reason, server 14I and dedicated client 12I preferably are contemplated as transmitting their own message boxes under the control-oriented protocol. Such message boxes behave like conventional message boxes, except they are displayed by the client device 12I at display 206. When the user answers such a message box, the client device 12 sends the user's answer back to the running application, again, in the form of an event rather than a return value. A message box call in accordance with this exemplary embodiment requires one additional parameter over those of Windows®. The additional parameter is an identification that is passed back to the application in the message box answer event, in order to help identify the specific message that the user has answered.

A special message is generated when the user of the client device seeks to close the application in use. Here, the user causes a request to close the application 13I to be sent from the client device 12I to the application. Unlike all other messages in the control-oriented protocol, the client device 12I does not execute the action specified by this message, before transmitting the message. Because the application is running on the server 14I, any indication that the application has been closed is made to come from the server. Upon receipt of a request to close message (or when action is taken by the server on its own to close an application), server 14I executes any code associated with the termination of the application, and checks whether such code requires interruption or cancellation of the closing. If there is no interruption or cancellation, application 13I transmits a close application message to the client device 12I and subsequently terminates. Preferably, upon receipt of a close application message from the application, the client device 12I destroys all references to the application and closes the application on the client device.

Operation

FIGS. 4A and 4B show a flowchart for operation of system 10. In step S-10, the client device 12I initiates a session by sending an open session message to server 14I. Step S-10 is could comprise a separate step of broadcasting a message over network 16 in search of all servers 14A through 14N that are associated with system 10, by virtue of their inclusion of a dedicated server 104. In this way, each client device 12A through 12M can search for all member servers 14A through 14N that recognize a broadcast request signal from any member client device 12I.

In step S-12, server 14I receives the open session message and registers the name of the user (user name), the password of the user, and appropriate information about the client device 12I and its dedicated client software 216. In step S-12, server 14I also confirms that the user name and password included as part of the open session message are valid and, if so, to which group the user is assigned. Next, in step S-14, server 14I determines, based upon information provided in the open session message, whether there is a more current version, for example, a repository-stored version, of the dedicated client software available for the client device to download. If there is a more recent version of client software available, in step S-16 server 14I sends to the client device 12I, message data representative of which software should be downloaded by the client device, and where that software is located. In step S-18, client device 12I downloads and installs updated dedicated client software 216 in accordance with the message data from server 14I.

If no software upgrade is necessary, or if upgrading has been completed, advance is made to step S-20 where server 14I replies to the client 12I with the application list message. The application list data identifies for the client device 12I, the applications that can be run by the user from the client device. Preferably, it also includes session setting information that governs the way the client device 12I will operate during the session. Applications authorized for use by the user can be displayed by title, icon or the like at display 206 in step S-20, whereupon the user enters a chosen application from the list at input 202.

Once the user of the client device has decided which application should be run, the user causes the client device 12I to transmit a run application message to server 14I in step S-22. Upon receipt of the run application message, server 14I will have all of the information necessary to start a dedicated application. This includes parameters of the client device 12I that will remotely interact with the selected application, such as the client device's operating system, screen-size, and microprocessor, which parameter information already was transferred to the server with the open session message in step S-10. In step S-24, the server 14I initializes and starts selected application 13I by passing to the application all of the parameter information about the client device 12I, and then running the application with a command appropriate for operating system 110 on the server 14I.

Once all the aforementioned application initialization steps have been completed and the application has been started, an initial form data message is sent from running application 13I to the client device 12I in step S-26. The initial form message includes all information necessary for the client device to draw or otherwise create the first screen of the application on the client device display 206, including necessary dedicated controls. Upon receipt of the initial form message, client device 12I displays a screen representing the interface with controls for the application running on the server, on client display 206, in step S-28. The initial form message information is all that is necessary to position and place all screen elements on the client device display 206 (or otherwise initiate a representation of the application on the client device). In this way, the application which began running on the server 14I in step S-26 is mimicked at the client device 12 display 206 in real time.

FIG. 4B continues the flow chart of FIG. 4A and illustrates how the interaction between the client device 12I and the application 13I takes place once the application is running on the server 14I. Once application 13I has started, communication between client device 12I and server 14I is based on occurrences selected as User-Control Events and Hardware Events.

In the absence of any event, the dedicated client 216 simply remains in a waiting mode, pending action by the user or some other reportable event. When it is determined that a Hardware Event or a User-Control Event occurs on the client device 12I as depicted in step S-30, client device 12I sends an event message to the application 13I in step S-32 to indicate which event occurred, and to provide any accompanying parameters that further specify the event or the data that is associated with the event. Previously, a User-Control Event, such as the user's selection of an item from a listbox was discussed as the User-Control Event. In this case, the client device 12I sends a selection message (step S-32) indicating that an item had been selected from the listbox, including a parameter indicating which item of the listbox has been selected. Thereafter, control returns to step S-30.

Next, under routine operation, another event will not occur on the client side and advance will be made to step S-34 where a corresponding User-Control Event occurs in the application on the server side. Here, the application 13I processes the client-side initiated event by executing any event procedure and associated code linked to the event, and then sends a server event message to the client device 12I in step S-36 to describe the corresponding server side event which occurred, and to provide data indicative of any new features necessary for the control user interface on the client device. If we continue the listbox example, if the listbox item were selected on the application, the application would transmit a listbox-click message back to the client device to indicate that the listbox was clicked, and to provide data specifying which item was selected by the click event.

It should be understood that step S-36 could, itself, comprise multiple steps. For instance, where no display screen change is warranted as a result of the server-side event in step S-36, process control simply returns to step S-30 wherein the dedicated client 216 awaits a next control operation activity. On the other hand, if, in step S-36 the corresponding event on the server-side necessitates a change in the presented user interface, this will be carried out by the application's provision of a new user interface data message to the client device 12I. In response to receipt of such updating interface data message, dedicated client 216 will change the screen at display 206 to mimic the application as it appears on server 14I. Thereafter, again process control will return to step S-30 to await a next activity by the user. Control flow continues in the manner depicted in FIG. 5B until the application terminates or is changed.

Later, when it is determined that the user requests that the application currently in use be closed in step S-38, a request to close the application 13I is sent from the client device 12I to the application in step S-40. In the preferred system 10, client device 12I cannot execute the action specified by the closure message before transmitting this message. All indications that the application has been closed must come from the server 14I. Thus, from the client device 12I, the user can do no more than transmit a request to close the application at step S-40. When the request to close is received by the application 13I, server 14I executes any code necessary for termination of the application, and checks whether such code requires interruption or cancellation of the closing. This is subsumed in decision step S-42. If there is no such interruption, the application 13I transmits a close application message to the client device 12I in step S-44 and subsequently terminates. Upon receipt of a close application message from the application on the server, client device 12I destroys all references to the application and thus closes the application thereon.

Dedicated Client Installation

Figure 5B:
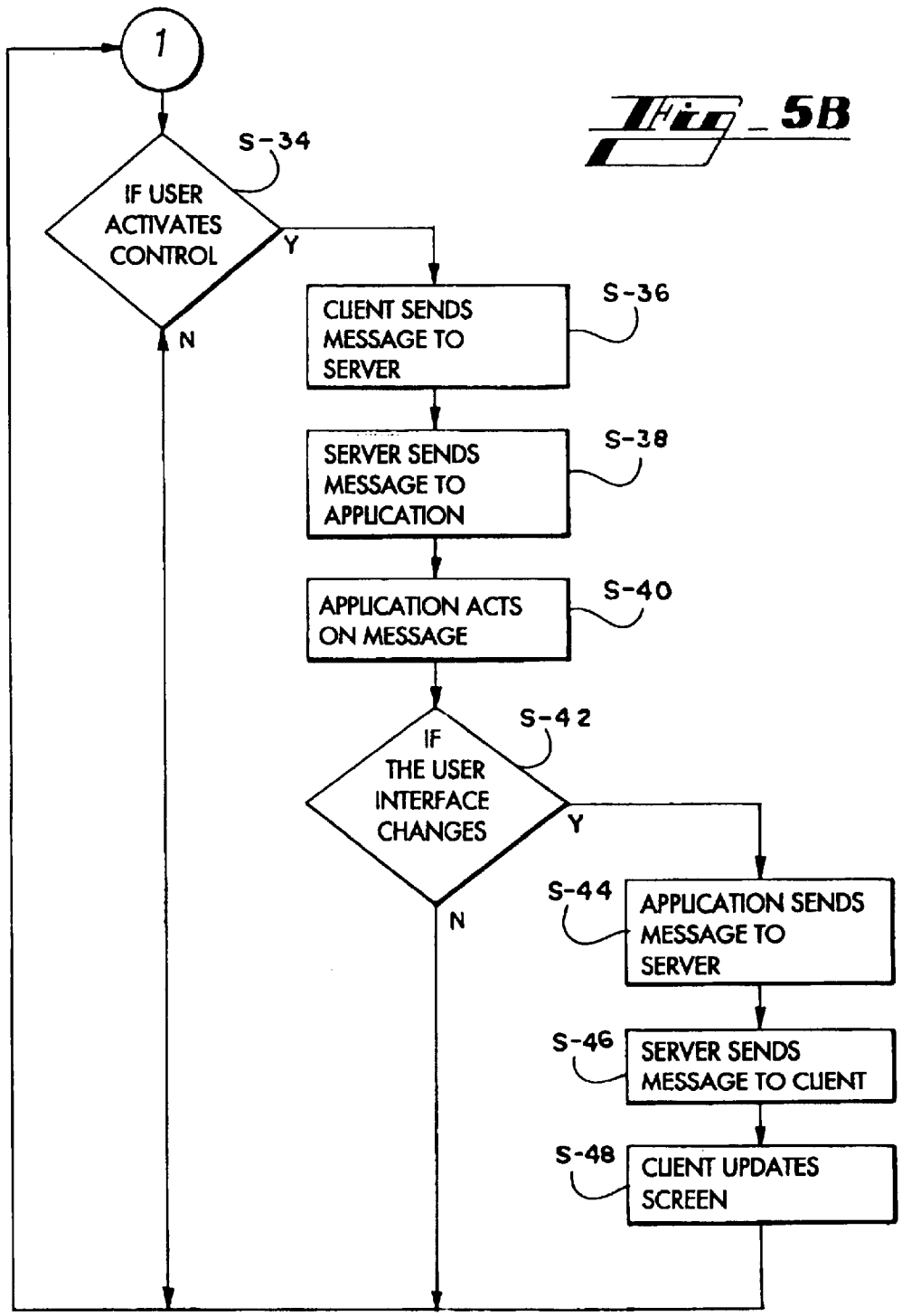

FIG. 5 is a process chart illustrating how a client device 12I in any configuration remotely can install and upgrade dedicated client software (dedicated client). Client device 12I issues a request to install dedicated client software 216 to the server 14I. Server 14I replies with an acknowledgement that the message requesting installation information has been received. Server 14I itself is equipped with a repository of updated client software, or the server at least has access to a remotely stored repository of such software and also information indicating the version of the client software to be downloaded to client device 12I. It is contemplated that the repository version of such software can be compared to the version of the client software in use at client device 12I. If an appropriate repository version of client software is found by the server 14I, it sends a message indicating what new version data should be downloaded by the client device 1012, and the location of the data. The client device 1012 acknowledges this data by sending an acknowledgement message to the server. Once the client device 1012 receives this message, it downloads the necessary files from server 14I, as indicated in the downloaded message and installs the files.

Exemplary Dedicated Application

Figure 6:
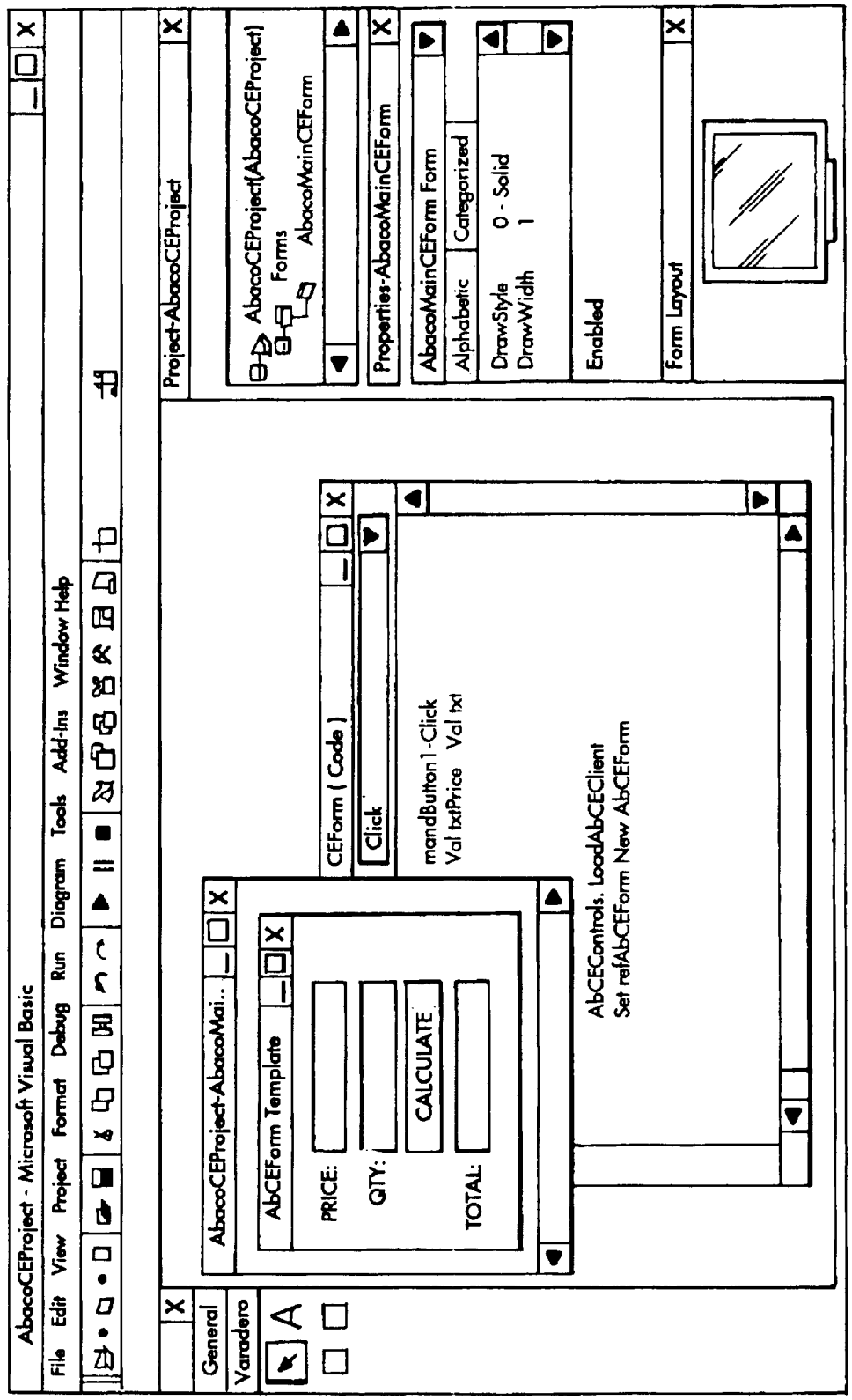
FIG. 6 is an illustrative diagram of a dedicated application run by the system of FIG. 3.
Figure 13:
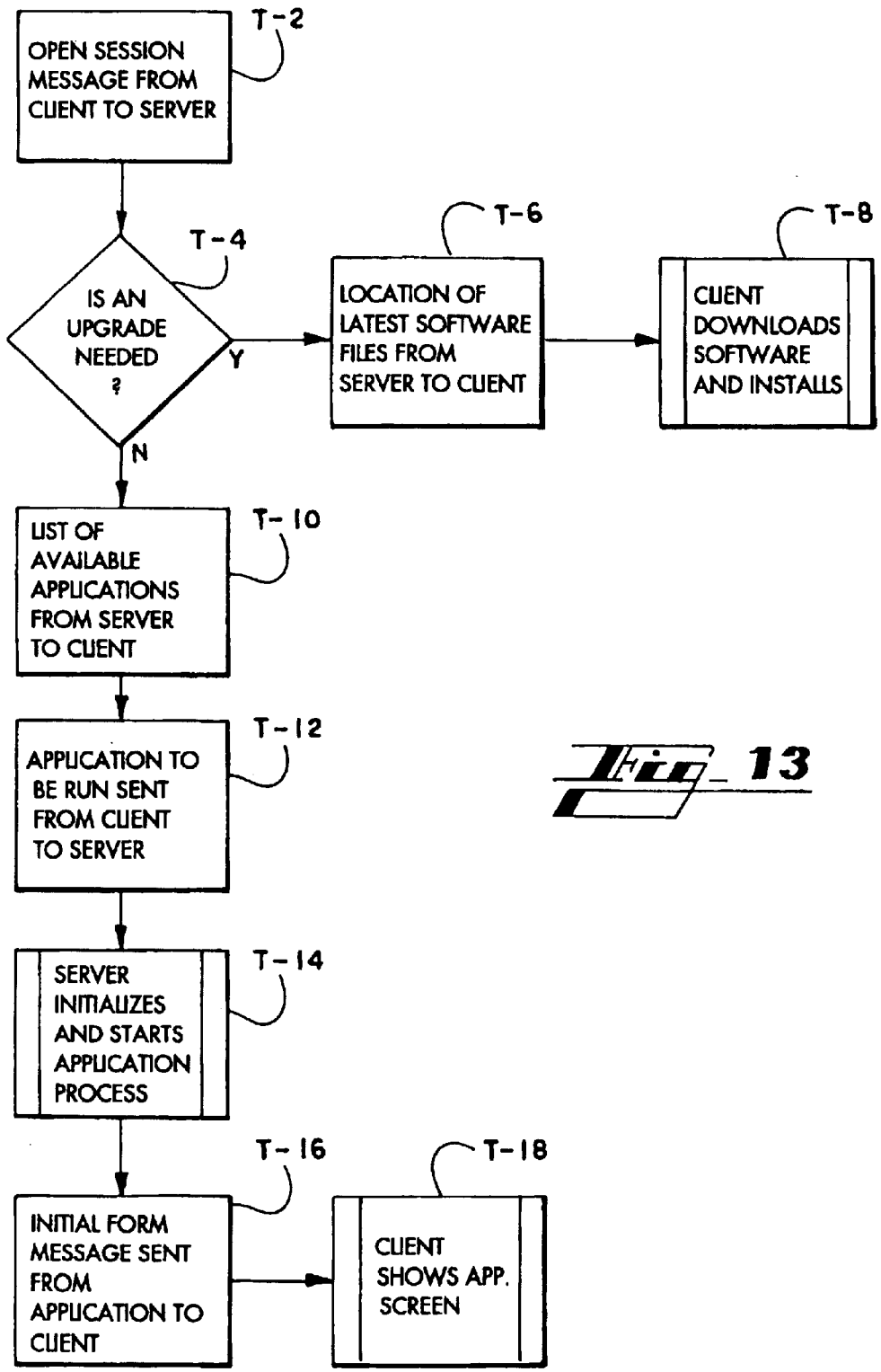

FIG. 6 illustrates an arbitrary dedicated application 13I. In the contemplated commercial embodiment, the application 13I would be developed in a high level, graphical environment (language) such as Visual Basic®, Delphi™, Visual J++®, J-Builder™, C++ Builder™, Visual C++® and Power Builder® or other such language with which those of ordinary skill are familiar. All such applications are compiled for the operating system 110 of the server 14I, and run on the server operating system. However, their graphics interface with the user, of course, is accessed by the operating system 200 of the client device 12. At the client-side, the user can launch new dedicated applications and switch between dedicated applications that are running. Application 300 can be created as well as run on system 10. At the time that the source code for application 300 is generated, the application is made to comply with the preferred control-oriented protocol.

As seen from FIG. 6, each dedicated application stored in data base 106 includes a directory of controls 302 that comply with the control-oriented protocol, and a form wrapper 304 which includes event handlers 306 that regulate communication between the dedicated application and the server, as described supra.

The form wrapper 304 initializes by passing it a reference to any regular form in the visual development language (e.g., Visual Basic®). Form wrapper 304 then assumes control over the communication details in any form. Any form from a conventional visual development software that is going to be used with system 10 must initialize a form wrapper as a load event, and thereafter destroy the form as an unload event. The running application 13I calls up internal event handler 306 to record all control operations made at the client device 12. Preferably, event handlers for input will provide a time stamp of each event, receive the specific event data, and record the type of input data. Event handlers for output likewise will provide a time stamp and a status indication of whether the requested function succeeded. In the case of a print command, for example, the output event handler would indicate whether or not data for which a print request was made, actually was successfully printed. Event handlers 306 also attend to all special occurrences (Hardware Events) such as communication errors, message box responses, and low battery indications and low memory indications, as well as other special events appreciated by those of ordinary skill in the art. In the preferred embodiment, the event handlers also can be made responsible for providing a hibernate message to the running application when the dedicated client 216 detects that the client device is low on memory power. When the running application 13I receives a hibernate message, it will initiate a shutdown or take other pertinent action to prevent the loss of data. As to communication errors, the event handlers are responsible for advising the running application thereof so that the application properly can attend to the error.

Alternative Embodiment

Figures 7, 8:
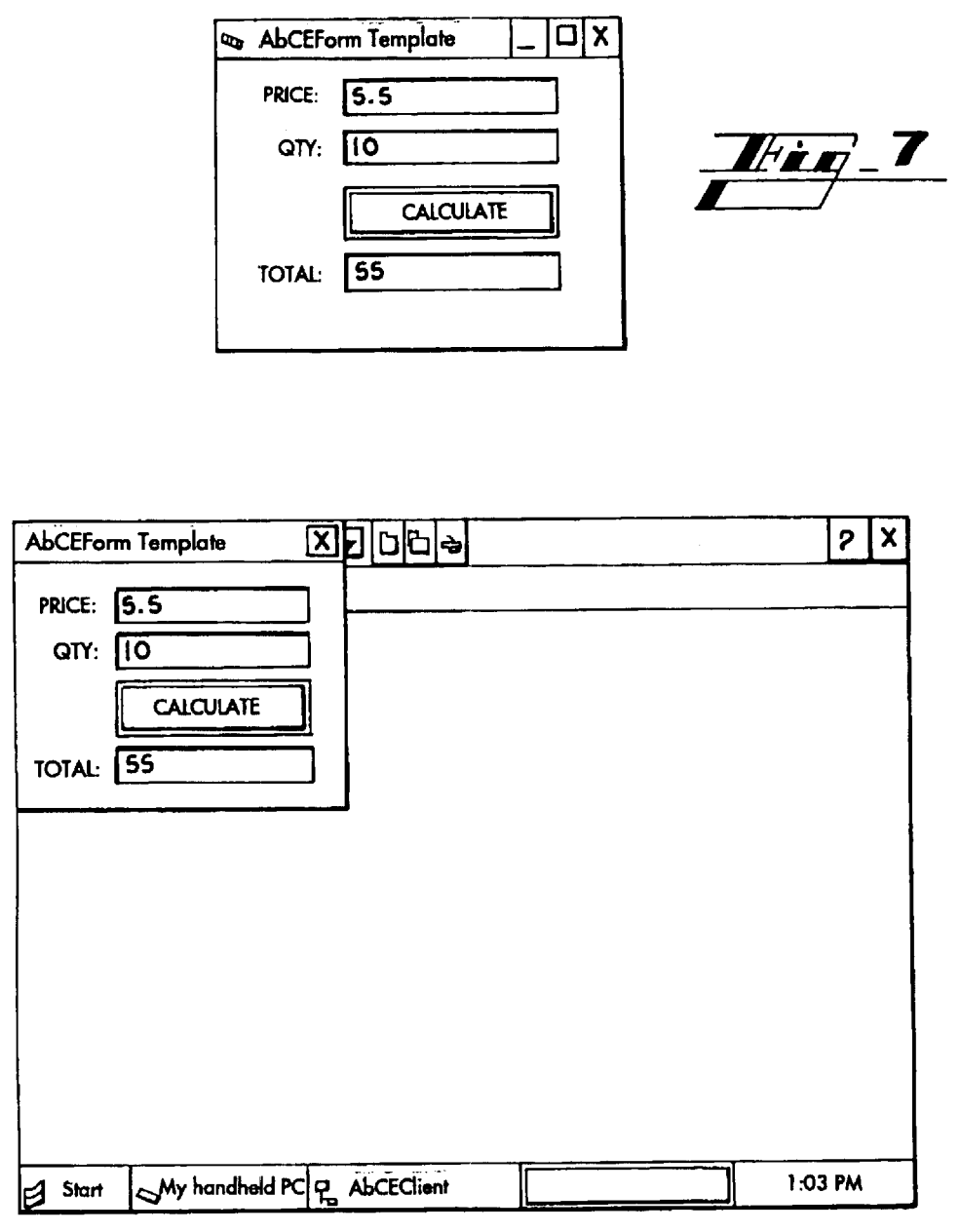

FIG. 7 is similar to FIG. 3 in showing details of an alternative embodiment of the invention. Here, the application 1013I is shown as running on a server 1014I. The application 1013I includes user interface programming controls 1302 and hardware programming controls 1304 which, in turn, interface with a communications layer 1306 that transmits messages in accordance with the control-oriented protocol of the present invention. The client device 1012I likewise is equipped with (dedicated) client software 1216 that transmits and receives messages contained in the control-oriented protocol. In the embodiment, when user-interface control messages are received, client software 1216 similarly controls display 1206 of the client device 1012 to present a proper user interface from the application 1013I. On the other hand, when hardware control messages are received at client device 1012I, the client software 1216 communicates with an abstract hardware layer 1218 to control the input and output hardware of physical hardware peripherals 1220 that are depicted as part of, or connected to the client device 1012I.

Conversely, in response to input from the user at the client user display 1206, client software 1216 transmits user control messages to the application 1013I to notify the application of such input from the user. In response to input from the input/output hardware peripherals 1220, the client software 1216 transmits hardware control messages to the application 1013I likewise to notify the application of the input received from the user. Here, preferably, the application 1013I interprets the control-oriented protocol messages through a control-oriented protocol communications layer 13O6 and processes the input through event procedures programmed by the developer of the application with the user interface programming controls 1302 and the hardware programming controls 13O4.

Exemplary Screen Displays

The flow charts of FIGS. 4A and 4B and their corresponding description set out in detail the opening and use of a dedicated application in accordance with the present invention. Next, exemplary screen displays are presented for detailing the creation and operation of a new application project in accordance with the invention. These exemplary screen displays were created using Visual Basic® run on the Windows NT® and Windows CE® operating systems discussed infra. FIG. 8 shows a screen display wherein a development project has been initiated to create a new application. Features of the new application are boxes for entering "Price" and "Qty" (quantity) data. The application will calculate the total for the user. Following registration of the new application in a server, the new application may be run on the server as illustrated in FIG. 9. FIG. 10, in turn, shows operating system 200 of client device 12 mimicking the running application on display 206.

In the preferred embodiment, all applications dedicated for system 10 would be de-bugged in a conventional manner. It is contemplated that de-bugging would be commenced in a manner similar to regular conventionally-created applications, such as those created in Visual Basic®. In addition, the dedicated application can be de-bugged while being displayed at the client-side device 12. All conventional de-bugging tools are to be made available while running a dedicated application.

It is to be understood that there can be various changes and/or modifications to the preferred embodiments of the present invention disclosed herein. These changes and/or modifications may be made by one of ordinary skill in the art. However, all such changes and/or modifications still would result in an arrangement well within the scope of the invention as set forth in the claims.

What is claimed is:

1. A thin-client system operative over a communications network, said system comprising:

a server computer including a communication control device for sending and receiving messages over the network and an operating system, said server having access to a data base storing a dedicated application dedicated to said system and executable by said operating system; and at least one thin-client device including display means, an external communication device for sending to and receiving messages from said server computer over said network, and dedicated client means for controlling said display means and said external communication device, said dedicated client means interpreting messages received from said server computer and generating messages recognizable by said server, said messages sent between said server computer and said client device conforming to a control-oriented protocol that restricts message communication to only messages describing certain preselected events associated with the dedicated application, wherein said preselected events include user control events caused by user action at said client device, each of said user control events being recognizable by a dedicated application running on said server as indicative of a certain control of said running application that is associated with said one of said preselected events and that is operable by a user at said client device to control said running application, and wherein said preselected events further include hardware events caused by user action at said client device and hardware events caused by conditions at said client device, and wherein a message from said client device to said server includes data representative of said one preselected event and excludes data representative of other user action performed in operation of said associated application control but not representative of said one event, and wherein said control-oriented protocol restricts message communication in windowing environments such that for edit boxes, loss of focus constitutes a significant event, whereby messages representing edit boxes will be transmitted only when such edit boxes have been made to lose focus;

for list boxes, selection from such a list box constitutes a significant event, whereby messages representing list boxes will be transmitted only when a selection from such a list box has been made and messages indicative of scrolling will not be transmitted;

for combo boxes, selection of a new value constitutes a significant event, whereby messages representing combo boxes will be transmitted only when a new value has been selected;

for scroll bars, arrival at a new scroll bar position after scrolling has stopped constitutes a significant event, whereby messages representing scroll bar movement will be transmitted only after scrolling has stopped at a new scroll bar position; and for mouse button clicks, a button click on such a mouse constitutes a significant event, whereby only mouse button clicks will be transmitted and messages indicative of mere mouse movements alone will not be transmitted.

2. A method, of communication between a thin-client device and a server computer over a communication network for interfacing said client device with a dedicated application executable on said server, said method comprising the steps of:

a said thin-client device, generating a message descriptive of a preselected event recognizable by said application as indicative of a certain application control that is associated with said preselected event and that is operable by a user at said client device, said message generating step including the steps of including data representative of said preselected event and excluding data representative of user action performed in operation of said associated application control but not representative of said preselected event;

at said client device, transmitting said message generated in said generating step over said network to said server, at said application, receiving said message transmitted by said client device during said transmitting step, interpreting data received in said message and representative of said preselected event in order to recognize said application control associated with said preselected event;

generating an acknowledgement message descriptive of an acknowledgement event at said application;

transmitting said acknowledgement message over said network to said client device;

at said application, determining whether said application control recognized in said interpreting step necessitates a change in a user interface created by said application, and in a case where said application control necessitates a change in said user interface, generating a message descriptive of a change user interface event recognizable by said client device as indicative of an updated user interface and creating said updated user interface at said application;

transmitting said change user interface message to said client device whereupon said client device interprets said transmitted change user interface message to recognize how a corresponding user interface presented at said client device should be changed to correspond to said update user interface created at said application;

generating a message descriptive of a Hardware event recognizable by said application as indicative of a certain condition at said client device, each Hardware event being recognizable by said application as an event either caused by user action or caused by said client device without user action;

transmitting said messages descriptive of Hardware events over said network to said application; and at said server, executing applications that include windowing environment application controls with each control associated with a preselected event for execution on said server in accordance with messages sent by said client device, wherein in said steps of executing applications with windowing environment controls further comprises the steps of:

for edit boxes, selecting as a significant event, a loss of focus whereby messages representing edit boxes will be transmitted only when such edit boxes have been made to lose focus;

for list boxes, selecting as a significant event, a selection from such a list box whereby messages representing list boxes will be transmitted only when a selection from such a list box has been made and messages indicative of scrolling will not be transmitted;

for combo boxes, selecting as a significant event, a selection of a new value whereby messages representing combo boxes will be transmitted only when a new value has been selected;

for scroll bars, selecting as a significant event, a new scroll bar position after scrolling has stopped whereby messages representing scroll bar movement will be transmitted only after scrolling has stopped at a new scroll bar position; and for mouse button clicks, selecting as a significant event, a button click on such a mouse whereby only mouse button clicks will be transmitted and messages indicative of mere mouse movements alone will not be transmitted.

3. A method of providing communication between a thin-client device and a server computer over a communication network for interfacing said client device with a dedicated application executable on said server, said method comprising the steps of:

selecting as a significant event, from among all actions performed by a user at said client device in operating a certain application control, an action necessary for said dedicated application to respond to the user's operation of said application control;

restricting communication of the user's actions in operating said application control to messages transmitted from said client device to said server, descriptive of said significant event; and selecting as significant events, acknowledgements of messages received, changes in user interface, Hardware events occurring at said client device, open session requests, list application requests, and close application requests, wherein, in windowing environments, said method includes:

for edit boxes, selecting as a significant event, a loss of focus whereby messages representing edit boxes will be transmitted only when such edit boxes have been made to lose focus;

for list boxes, selecting as a significant event, a selection from such a list box whereby messages representing list boxes will be transmitted only when a selection from such a list box has been made and messages indicative of scrolling will not be transmitted;

for combo boxes, selecting us a significant event, a selection of a new value whereby messages representing combo boxes will be transmitted only when a new value has been selected;

for scroll bars, selecting as a significant event, a new scroll bar position after scrolling has stopped whereby messages representing scroll bar movement will be transmitted only after scrolling has stopped at a new scroll bar position; and for mouse button clicks, selecting as a significant event, a button click on such a mouse whereby only mouse button clicks will be transmitted and messages indicative of mere mouse movements alone will not be transmitted.

* * * * *